Jan. 21, 1964 P. E. PRITCHARD ETAL 3,118,978

MAGNETIC STEREOPHONIC PHONOGRAPH CARTRIDGE

Filed Feb. 27, 1958

INVENTORS:
PETER E. PRITCHARD,
ROY DALLY,

BY Charles W. Helzer

THEIR ATTORNEY.

United States Patent Office 3,118,978
Patented Jan. 21, 1964

3,118,978

MAGNETIC STEREOPHONIC PHONOGRAPH CARTRIDGE

Peter E. Pritchard and Roy Dally, Skaneateles, N.Y., assignors to General Electric Company, a corporation of New York Filed Feb. 27, 1958, Ser. No. 717,943
3 Claims. (Cl. 179—100.41)

The present invention relates to stereophonic phonograph pickup cartridges.

More particularly, the present invention relates to a variable magnetic reluctance pickup cartridge for use with stereophonic disc records.

In recent years an entirely new business known as the high fidelity phonograph industry has come into being. It is one of the purposes of this business to provide equipment for home use capable of reproducing recordings of musical and other productions with considerable fidelity. In the past, the primary emphasis of this industry has been in connection with equipment capable of monaural reproduction of disc records. It appears however that the emphasis in the industry is shifting to stereophonic recordings. By stereophonic recordings is generally meant two separate sound tracks of the same production with each sound track being picked up and recorded from different localities in the space in which the production is being rendered. At present most of the commercially available stereophonic recording equipment is of the magnetic tape type; however, recently certain disc record manufacturers have introduced stereophonic two-channel disc records in which separate sound tracks are recorded on each side of the groove of a micro-groove record. By this technique it has been possible to record a production stertophonicolly in the same amount of disc record space previously required for conventional monoaural micro-groove recording.

It is a primary purpose of this invention to provide a variable magnetic reluctance pickup cartridge for use with stereophonic two-channel disc records of the above-mentioned type.

Another object of the invention is to provide a stereophonic variable magnetic reluctance phonograph pickup cartridge for use with stereophonic disc records, which cartridge is compatible with existing monaural micro-groove disc records.

In practicing the present invention a phonograph pickup cartridge of the variable reluctance pickup type is provided which includes a body member. Supported in the body member are a pair of separate downwardly depending core members terminating in spaced-apart pole pieces, and having separate pickup coils surrounding each of the core members. The spaced-apart pole pieces have opposing surfaces which form approximately a right angle with respect to each other. Also supported in the body member is a permanent magnet which is spaced from the core members. To complete the cartridge an armature of magnetic material is supported on the body member and has a record engaging stylus which is adapted to be disposed between the spaced-apart pole pieces. This results in the structure in which the armature is included in a magnetic circuit that further includes a permanent magnet and the core members.

Other objects, features and many of the attendant advantages in this invention will be appreciated more readily by reference to the following detailed description when considered in connection with the accompanying drawing, wherein like parts in each of the several figures are identified by the same reference character, and wherein.

Figure 1:
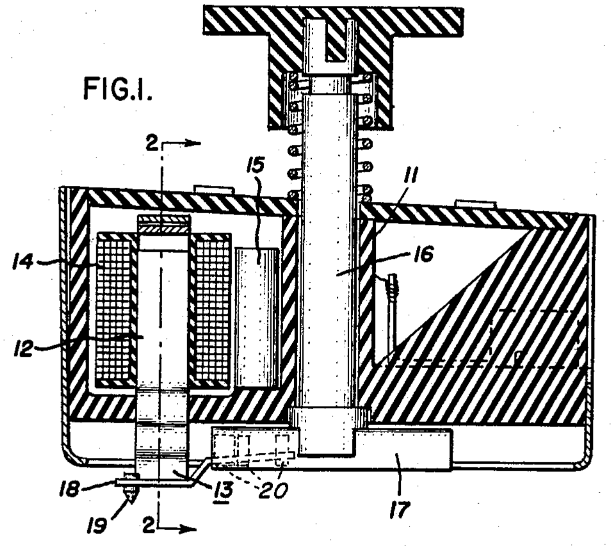
FIG. 1 is a sectional view of a variable magnetic reluctance phonograph pickup cartridge constructed for use with stereophonic disc records in accordance with the invention.
Figure 3:
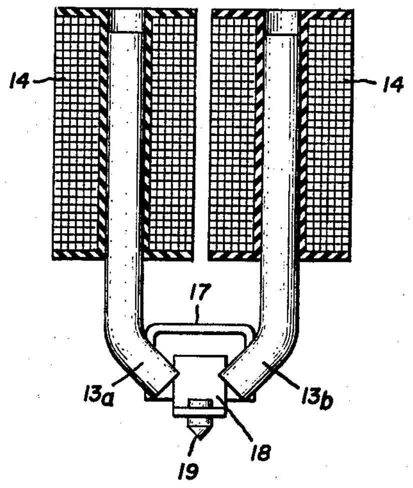
Figure 4:
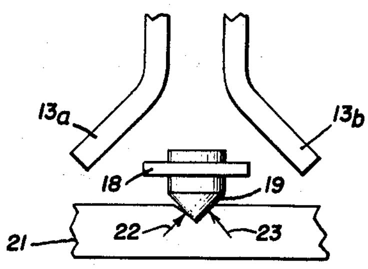

FIG. 3 is a sectional view of a modified form of the variable magnetic reluctance phonograph pickup cartridge constructed in accordance with the invention; and FIG. 4 is a close-up end view of the pole pieces of the phonograph pickup cartridge shown in FIG. 1, and illustrates the manner in which the record engaging stylus thereof coacts with the pole pieces of the cartridge to vary the magnetic flux between the pole pieces and the stylus.

Figure 2:
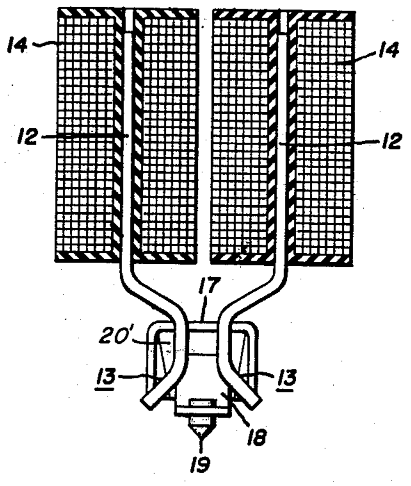
FIG. 2 is a cross-sectional view of a phonograph pickup cartridge taken through plane 2—2 of FIG. 1.

The variable magnetic reluctance phonograph pickup cartridge illustrated in FIG. 1 of the drawing comprises a body member 11 formed from a molded plastic such as an epoxy resin, and in which there are a number of openings provided during the manufacture of the body. Supported in one of these openings in the body member 11 are a pair of separate core members 12 which may be formed of a nickel alloy steel, and which terminate in a pair of spaced-apart downwardly depending pole pieces 13. As best shown in FIG. 2 of the drawings each of the core members 12 has an electrical pickup coil 14 surrounding it. The electrical pickup coils 14 are conventional helically-wound coils and are electrically connected to separate output terminals so that separate electrical signals may be derived from each coil. Spaced in a line within body member 11 from the coil windings 14 and core members 12 is a cylindrically-shaped alnico bar magnet 15, and an opening for receiving a post 16. The post 16 comprises a part of a replaceable stylus assembly, and is removably and frictionally held in the opening in body member 11 by a cap and coacting coil spring. Secured in T-fashion to the bottom end of the replaceable post 16 is a channel member 17 which has a generally U-shaped cross-section, and has a plurality of damping blocks 20 secured therein. The frontmost of the damping blocks 20 may be keystone-wedge-shaped as shown in FIG. 2 at numeral 20′. Secured to the damping blocks is a crank-shaped magnetic armature 18 having a record engaging stylus 19 secured to a downwardly depending crank arm portion. The replaceable stylus assembly formed by the post 16, channel member 17 and crank-shaped magnetic armature 18, is identical in construction to the preferred replaceable stylus assembly described in U.S. Patent No. 2,937,243, issued May 17, 1960, entitled "Phonograph Armature and Stylus Assembly," P. E. Pritchard, inventor, and assigned to the same assignee as the present invention. If desired, the replaceable stylus assembly may be of the form using a slide-in replaceable assembly also disclosed in the above-identified patent. The record engaging stylus 19 and armature 18 are adapted to be disposed between the spaced-apart pole pieces 13 which as best shown in FIGS. 2 and 4 of the drawings have opposing 45 degree surfaces which form substantially a right angle. In the embodiment of the invention shown in FIGS. 2 and 4, the spaced-apart pole pieces 13 are bent apart to form substantially a right angle plus or minus ten degrees with respect to each other.

In operation, the magnetic armature 18 is vibrated as a simple mass by the record engaging stylus 19 which is disposed in a groove of a record indicated at 21 having opposing forty-five degree sides. As shown in FIG. 4, the stylus 19 is shaped to engage both side-walls of the groove simultaneously. Each of the sides of the grooves of the stereophonic disc record 21 is modulated with a separate sound track so that each side tends to translate the stylus 19 in accordance with its own intelligence. For example, the side indicated by the arrow 22 in FIG. 4 of the micro-groove tends to modulate or translate the stylus 19, and hence the magnetic armature 18, in the direction of the arrow 22 hence varying the air gap between the magnetic armature 18 and the pole piece 13*b*. By observation of the enlarged relative dimensions of the parts as shown in FIG. 4, it will be seen that while being translated toward the pole piece 13*b* the magnetic armature 18 moves substantially parallel to the surface of the pole piece 13*a* so that substantially no variation of the air gap occurs between the pole piece 13*a* and the magnetic armature 18. This lack of variation of the air gap between pole piece 13*a* and the armature 18 is achieved because the magnetically effective dimension of the armature 18 facing the pole piece 13*a*, in the plane of the drawing and transverse to the axis of the armature 18, is different, e.g. smaller, than the dimension of the pole piece 13*a* facing the armature 18. It is obvious that if the mutually facing dimensions of the armature 18 and pole piece 13*a* were the same, then vibration of the armature 18 in the direction 22 would undesirably vary the effective size of the air gap between the armature 18 and the pole piece 13*a*. This would generate an undesired "cross-talk" signal in the coil 14 associated with the pole piece 13*a*, in addition to the desired signal generated in the coil 14 associated with the pole piece 13*b*. While the record engaging stylus 19 is riding on the opposite side of the micro-groove in record 21 indicated by the arrow 23, it is translated in the direction of the arrow 23 thereby varying the air gap space between the magnetic armature 18 and the pole piece 13*a*. During this action, the magnetic armature 18 is moving substantially parallel to the surface of the pole piece 13*b* so that, for the reasons explained above regarding movement of the armature 18 parallel to the other pole piece 13*a*, no variation in the air gap occurs in the space therebetween. In this manner, translation of the record engaging stylus 19 by the undulations on each side of the micro-groove in record 21 causes the magnetic flux passing from permanent magnet 15 through the magnetic armature 18 across the air gap between the spaced-apart pole pieces and the end of the armature to be varied in accordance with the intelligence in the record groove, and to thereby vary the magnetic flux threading the core members 12. This variation in the magnetic flux in the core members 12 produces separate electrical signals in each of the pickup coils 14 which are connected to separate amplifier and amplifier loudspeaker systems, and which are effectively separated.

An alternative embodiment of the invention is shown in FIG. 3 of the drawing. In this embodiment of the invention, the core members 13*a* and 13*b* of the stereophonic phonograph pickup cartridge are formed from long bars of magnetic material such as a nickel alloy steel, and have approximately a rectangular cross-section in the neighborhood of .012 inch by .030 inch. The lower ends of core members 13*a* and 13*b* are bent inwardly toward each other so that their opposing surfaces, which are at substantially a right angle plus or minus 10 degrees with respect to each other, define an air gap.

In operation, the embodiment of the invention shown in FIG. 3 functions in much the same manner as that disclosed with relation to FIGS. 2 and 4. It has been determined however that there is substantially less leakage flux and hence better separation is obtained between the two signals formed on each side of the micro-grooves of the record with the form of the invention shown in FIG. 3. In practice, it has been determined that separation in the neighborhood of 20 decibels can be obtained between the sound tracks on each side of the micro-groove in the stereophonic disc record.

From the foregoing description, it can be appreciated that the present invention makes available a variable magnetic reluctance pickup cartridge for use of stereophonic two-dimension disc records which is capable for use with existing monaural micro-groove disc records.

Obviously, other modifications and variations of the present invention are possible in line with the above teachings. It is therefore to be understood that changes may be made in the particular embodiment of the invention described which are within the full intended scope of the invention as defined by the appended claims.

What I claim as new and desire by Letters Patent of the United States is:

1. A phonograph pickup cartridge of the variable reluctance type including in combination a body member, a pair of downwardly depending core members supported by said body member, a pickup coil surrounding each core member, said core members terminating in spaced-apart pole pieces having opposing surfaces forming approximately a right angle with respect to each other, said opposing surfaces being at angles of approximately 45° from vertical when said cartridge is in operating position, a permanent magnet supported by said body member and spaced from said core members, and a replaceable stylus assembly including a post adapted to be removably supported in said body member, a first arm of non-magnetic material secured to said post in cantilever-fashion, at least one block of damping material secured to said first arm, a crank-shaped armature of magnetic material secured to said block of damping material with a downwardly depending crank arm portion adapted to extend intermediate the opposing surfaces of said spaced-apart pole pieces in a direction substantially parallel to both of said opposing surfaces, the effective dimensions of said armature that respectively face said opposing surfaces of the pole pieces in a plane perpendicular to the axis of the armature being different than the dimensions in said plane of the respective opposed surfaces of the pole pieces, said armature being included in a magnetic circuit that further includes said permanent magnet, said spaced-apart pole pieces and said core members, and a stylus attached to said crank arm portion.

2. A phonograph pickup cartridge of the variable reluctance type including in combination a body member, a pair of downwardly depending core members supported by said body member, a pickup coil surrounding each core member, said core members terminating in spaced-apart pole pieces having opposing surfaces forming approximately a right angle with respect to each other, said opposing surfaces being at angles of approximately 45° from vertical when said cartridge is in operating position, a permanent magnet supported by said body member and spaced from said core members, and a replaceable stylus assembly including a post adapted to be removably supported in said body member, an open-ended channel member secured to said post with its open side facing down, three blocks of damping material with two of the blocks being secured in the channel member and the third block being keystone-wedge-shaped and freely seated in the channel member, an armature of magnetic material in the form of an inverted Z-shaped crank having one elongated arm extending through and secured to said three blocks of damping material with the freely supported third block being adjacent a downwardly depending remaining crank arm portion of the armature, said crank arm portion being adapted to extend intermediate the opposing surfaces of said spaced-apart pole pieces in a direction substantially parallel to both of said opposing surfaces, the effective dimensions of said armature that respectively face said opposing surfaces of the pole pieces in a plane perpendicular to the axis of the armature being different than the dimensions in said plane of the respective opposed surfaces of the pole pieces, said armature being included in a magnetic circuit that further includes said permanent magnet, said spaced-apart pole pieces and said core members, and a stylus attached to said crank arm portion.

3. A phonograph pickup cartridge of the variable reluctance type including in combination a body member, a pair of downwardly depending core members supported by said body member, a pickup coil surrounding each core member, said core members terminating in spaced-apart pole pieces having opposing surfaces forming approximately a right angle with respect to each other, said opposing surfaces being at angles of approximately 45° from vertical when said cartridge is in operating position, a permanent magnet supported by said body member and spaced from said core members, and a replaceable stylus assembly including a post adapted to be removably supported in said body member, an open-ended channel secured to said post and extending in the direction of the pole pieces, at least one base of non-magnetic material slidably mounted in said channel and frictionally retained thereby, at least one block of damping material secured to said base, and a crank-shaped armature of magnetic material secured to said damping block and having a downwardly depending crank arm portion adapted to extend intermediate the opposing surfaces of said spaced-apart pole pieces in a direction substantially parallel to both of said opposing surfaces, the effective dimensions of said armature that respectively face said opposing surfaces of the pole pieces in a plane perpendicular to the axis of the armature being different than the dimensions in said plane of the respective opposed surfaces of the pole pieces, said armature being included in a magnetic circuit that further includes said permanent magnet, said spaced-apart pole pieces and said core members, and a stylus attached to said crank arm portion.

References Cited in the file of this patent

UNITED STATES PATENTS

| | | |
|---|---|---|
| 2,093,540 | Blumlein | Sept. 21, 1937 |
| 2,114,471 | Keller | Apr. 19, 1938 |
| 2,554,209 | Miner et al. | May 22, 1951 |
| 2,776,342 | Dally | Jan. 1, 1957 |
| 2,820,853 | Dally | Jan. 21, 1958 |
| 2,864,897 | Kaar | Dec. 16, 1958 |
| 2,875,282 | Reiback | Feb. 24, 1959 |

FOREIGN PATENTS

| | | |
|---|---|---|
| 334,551 | Great Britain | Sept. 5, 1930 |